United States Patent [19]

Kohno

[11] Patent Number: 5,193,146
[45] Date of Patent: Mar. 9, 1993

[54] PULSE WIDTH MODULATION CONTROL SYTEM FOR A MOTOR

[75] Inventor: Keiichi Kohno, Kawasaki, Japan

[73] Assignee: Fujitsu Limited, Kawasaki, Japan

[21] Appl. No.: 570,022

[22] Filed: Aug. 20, 1990

[30] Foreign Application Priority Data

Aug. 18, 1989 [JP] Japan ................ 1-213467

[51] Int. Cl.$^5$ ............................... H02P 5/17
[52] U.S. Cl. .................... 388/811; 388/813; 318/599
[58] Field of Search ............... 318/599-602, 318/798-799, 807-811, 254, 139, 438; 388/810, 811-813, 912

[56] References Cited

U.S. PATENT DOCUMENTS

| | | | |
|---|---|---|---|
| 4,283,671 | 8/1981 | Nakano et al. | 388/811 X |
| 4,323,832 | 4/1982 | Okamura | 388/811 |
| 4,516,065 | 5/1985 | Ninomiya et al. | 318/811 |
| 4,575,667 | 3/1986 | Kurakake | 318/811 |
| 4,739,230 | 4/1988 | Sonobe et al. | 388/811 X |
| 4,843,288 | 6/1989 | Volz et al. | 388/811 X |
| 4,910,448 | 3/1990 | Tomisawa et al. | 388/811 X |
| 4,965,504 | 10/1990 | Ueda et al. | 318/811 X |

FOREIGN PATENT DOCUMENTS

| | | |
|---|---|---|
| 006182Y | 1/1982 | European Pat. Off. . |
| 237682 | 12/1986 | Japan . |
| 332099 | 6/1989 | Japan . |

Primary Examiner—William M. Shoop, Jr.
Assistant Examiner—David Martin
Attorney, Agent, or Firm—Staas & Halsey

[57] ABSTRACT

A pulse width modulation (PWM) control system for rotating a spindle motor and a rotatable recording medium at a constant speed. The PWM control system includes a coil phase detecting circuit for detecting a change of stator coil phase based on detecting a rotor magnetic pole and for providing a detecting signal based on the detected phase change; a spindle motor driving circuit for controlling a supply of power to the coils based on the detecting signal; a rotation reference signal generating circuit for generating a rotation reference signal which defines the constant speed of the spindle motor; a real rotation detecting circuit for detecting a real rotation speed of the rotor of the spindle motor and for providing an index signal based on the detection of real rotation; a coil phase selection timing circuit for deciding a selection timing of the coil phase based on the detecting signal and for providing a coil phase selecting signal based on said deciding a selection timing; and a microprocessor for determining a pulse width of a PWM signal based on a phase difference between the rotation reference signal and the index signal, and for providing the PWM control signal with the determined pulse width in synchronization with the deciding of the coil phase selection timing circuit to the spindle motor driving circuit.

16 Claims, 11 Drawing Sheets

PULSE WIDTH MODULATION CONTROL SYTEM FOR A MOTOR

BACKGROUND OF THE INVENTION

The present invention relates to a Pulse Width Modulation (PWM) control system for a DC motor. More particularly, the present invention relates to a spindle motor PWM control system that maintains a constant rotating speed by controlling the pulse duration based on a phase difference between a rotational reference signal and real or measured rotational signal.

In memory reading apparatus using a rotatable recording medium such as a magnetic disk apparatus and optical disk apparatus, the disk must rotate at a constant speed. A brushless type DC motor can be used as a spindle motor for this purpose. PWM control can be employed to control the on period of stator coil power pulses based on a phase difference between a rotational reference and a real rotation signal. This approach provides power control of the stator coil based on rotation of rotor and accurately maintains the motor rotation at a constant rate. One example of such PWM control is disclosed in Japanese Unexamined Patent Publication (Kokai) No. 62-149069 issued on Jul. 3, 1987.

Figure 1:
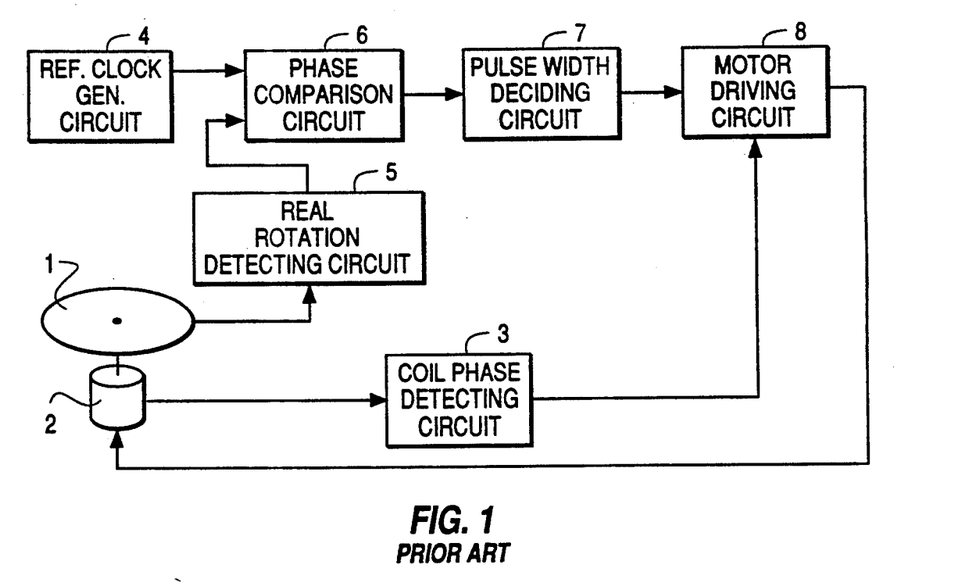
FIG. 1 is a structural block diagram of a prior art PWM control system.
Figure 2:
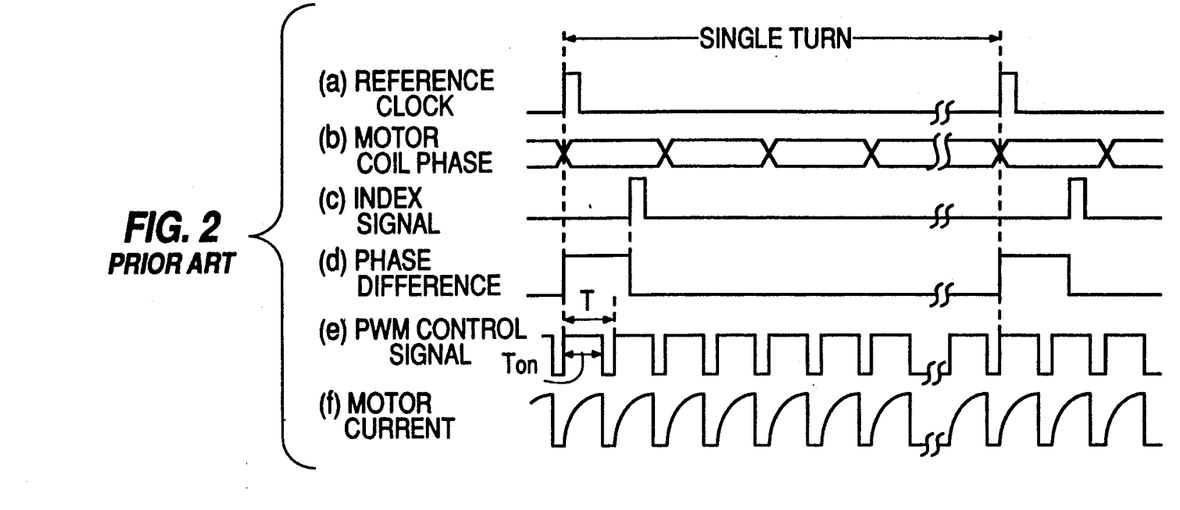
FIG. 2 is a timing diagram illustrating waveforms of signals in the FIG. 1 system.
Figure 3:
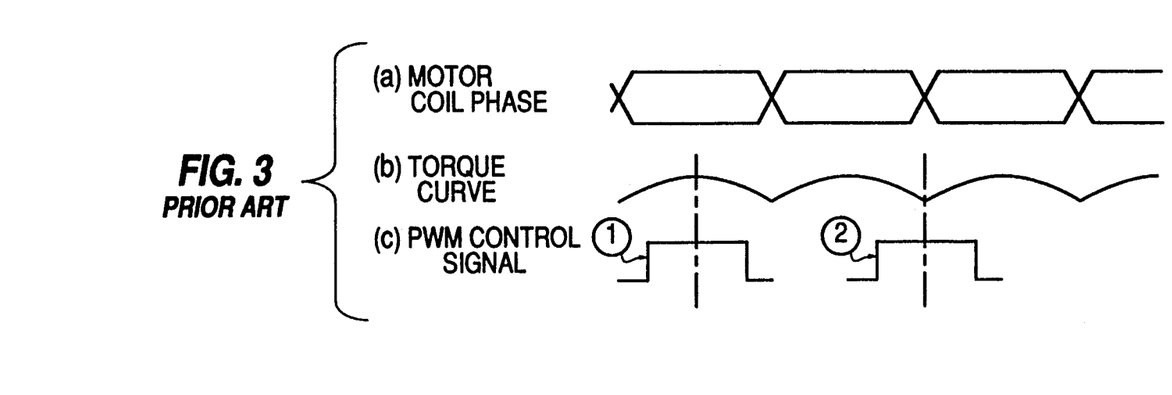
FIG. 3 is a timing diagram illustrating waveforms of a torque curve corresponding to a stator coil phase and a PWM control signal in the FIG. 1 system.

FIG. 1 is a block diagram of a PWM control system. FIG. 2 is a timing diagram for the FIG. 1 system. FIG. 3 is a timing diagram that illustrates a relationship between motor torque coil phase and a PWM control signal in the FIG. 1 system.

In FIG. 1, a spindle motor 2 rotates a disk or recording medium 1 (e.g., a magnetic disk or optical disk) at a constant speed such as 3600 rpm. The spindle motor 2 can comprise a brushless type DC motor. Control of the spindle motor 2 is realized by controlling the power supplied to the stator coil via, e.g., a transistor switch and basing this control on the stator coil phase which is shown in waveform (b) of FIG. 2.

A reference clock generating circuit 4 (FIG. 1) generates a reference clock such as waveform (a) shown in FIG. 2. The reference clock determines the period of a single revolution of the disk 1. The real rotation detecting circuit 5 detects, via a disk read head, an index signal that is generated once for each complete rotation of the disk 1. A phase comparison circuit 6 detects a phase difference between the reference clock and the index signal. In the example waveforms shown in FIG. 2, the index signal follows the reference clock. In this case, acceleration control must be performed for the spindle motor 2.

A pulse width deciding circuit 7 controls the width of the PWM control signal as shown in waveform (e) of FIG. 2. This control is based on the detected phase difference (waveform (d) shown in FIG. 2) provided by the phase comparison circuit 6. In other words the pulse width deciding circuit varies the time Ton based on the detected phase difference. As seen in the FIG. 2 waveforms the time Ton is short compared to the time for a single turn of the disk 1. When the motor speed must be increased, the pulse duration Ton must be increased and when the motor speed must be decreased, the pulse duration must be reduced. As shown in FIG. 1, the PWM control signal is supplied to a motor driving circuit 8. The motor drive circuit 8 drives the motor 2 based on the PWM control signal; and as a result, generates a motor current is as shown in waveform (f) of FIG. 2.

However, with the above spindle motor PWM control system, the coil phase and PWM signal are asynchronous as shown in waveforms (b) and (e) of FIG. 2. Because these signals are asynchronous, the motor torque is different depending on the coil phase, even when the PWM control signal having a constant duration. Thus, motor control accuracy is lowered.

Referring to FIG. 3, waveform (b) represents motor torque. The peak torque occurs at the center of the coil phase represented by waveform (a). The minimum torque occurs at the selecting region or change of the coil phase. If the center of PWM control signal 1 occurs at the time of peak torque as shown in FIG. 3, then the motor 12 is effectively accelerated. However, if the center of PWM control signal 2 occurs at the time of minimum torque as shown in FIG. 3, then the motor is effectively decelerated. As a result, motor rotation (e.g., acceleration) is different depending on the rotational position, even during a single rotation with a PWM control signal having a constant pulse width. This causes steady phase error to become large; and thus, the accuracy of motor rotation control is lowered. The above PWM spindle motor control system is used in five inch disk drives manufactured by Fujitsu Limited in Japan and sold in the U.S.A. as model M-2663E.

SUMMARY OF THE INVENTION

It is an object of the present invention to provide a new and improved PWM DC motor control system.

It is another object of the present invention to provide a PWM spindle motor control system that maintains constant motor speed.

It is a further object of the present invention to provide a PWM spindle motor control system which minimizes steady phase error by maintaining constant motor rotation during a single revolution.

To achieve the above and other objects, the present invention provides a PWM control system for DC motor that has a plurality of coils and magnets. The DC motor has a rotational position sensor on a stator for sensing a rotational position of the DC motor rotor. The PWM control system comprises: (a) coil phase detecting means, connected to the rotating position sensor, for detecting a change of coil phase based on the condition of stator coil magnetic pole and for outputting a detection signal; (b) motor driving means for controlling a supply of power to the stator coils based on the detection signal; (c) rotation reference signal generating means for generating a rotation reference signal in accordance with a rotational speed of the DC motor; (d) real rotation detecting means for detecting a real rotation of the rotor and for providing a real rotation signal based on the detection of the real rotation; (e) coil phase selection timing deciding means for determining a stator coil phase selection timing based on the detection signal; and (f) pulse width control means for generating, in synchronization with the stator coil phase selection timing, a PWM control signal having a pulse width, and for controlling the pulse width based on a phase difference between the rotational reference signal and the real rotation signal.

In a preferred embodiment of the present invention, the pulse width control means comprises a program controlled microprocessor including a pulse width control program. The control program determines the pulse width of the PWM control signal, and generates the PWM control signal in synchronism with the stator coil phase selection timing.

DETAILED DESCRIPTION OF THE PREFERRED EMBODIMENTS

Figure 4A:
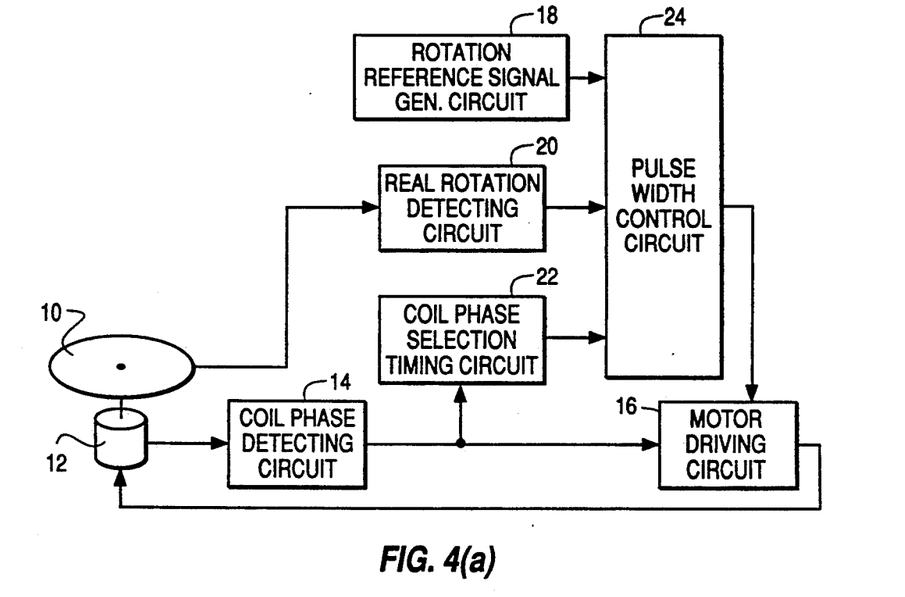
FIGS. 4(a) and 4(b) are respectively a block diagram and timing diagram of a PWM control system embodying the present invention.
Figure 4B:
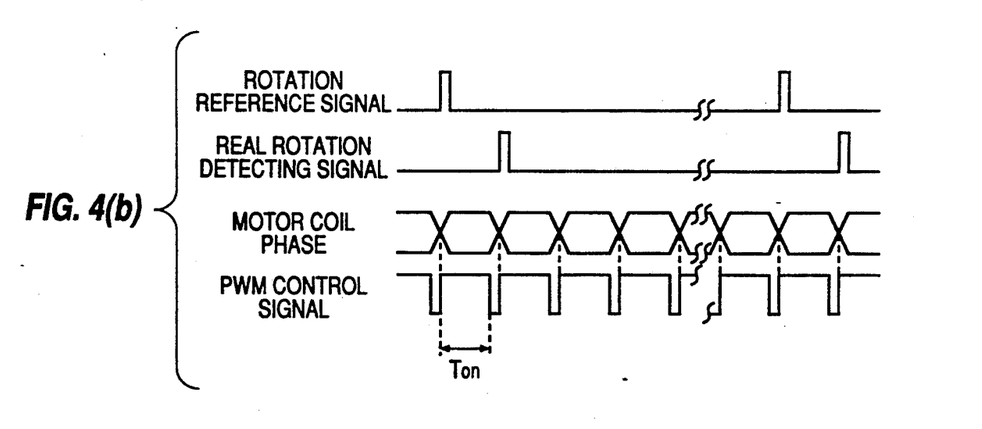

FIGS. 4(a) and 4(b) are respectively a block diagram and timing chart of a PWM control system embodying the present invention. Referring to FIG. 4(a), a spindle motor 12 (e.g., a brushless DC motor) rotates a rotatable recording medium 10 at a constant speed. The recording medium 10 can be a magnetic disk that is rotated at a constant speed, for example, 3600 rpm. A coil phase detecting means 14 receives a rotor position from hall elements (e.g., FIG. 6) inside the spindle motor 12. The coil phase detecting means 14 detects stator coil phase changes. The detecting means 14 generates a motor coil phase signal as shown in FIG. 4(b) based on detecting magnetic poles of the spindle motor 12. A motor driving circuit 16 controls the supply of power to the spindle motor 12 stator coils based on the motor coil phase signal. A rotation reference signal generating circuit 18 includes a crystal oscillator that generates a rotation reference signal as shown in FIG. 4(b). This signal determines the rotating speed of the rotatable recording medium 10. A real rotation detecting circuit 20 detects real (or actual rotation) of the rotatable recording medium 10, and outputs a real rotation detecting signal as shown in FIG. 4(b). A coil phase selection timing deciding circuit 22 determines stator coil phase selection timing based on the detection signal. A pulse width control circuit 24 generates, in synchronism with the stator coil phase selection timing; a PWM control signal, having a pulse width (Ton), controls the pulse width based on the phase difference between the rotational reference signal and the real rotation signal.

In accordance with the present invention, a rising edge of the PWM control signal pulse, shown in FIG. 4(b), is synchronized with the selection timing of the motor coil phase. Thus, during a single rotation of the motor 12, the PWM control signal has a constant positional relationship with respect to the motor coil phase. As a result, the motor torque characteristic during each coil phase is constant; and thus, the motor rotation during a single motor rotation is constant. Accordingly, the generation of a steady phase difference due to fluctuation of torque can be minimized and rotating accuracy can be improved remarkably.

Figure 5:
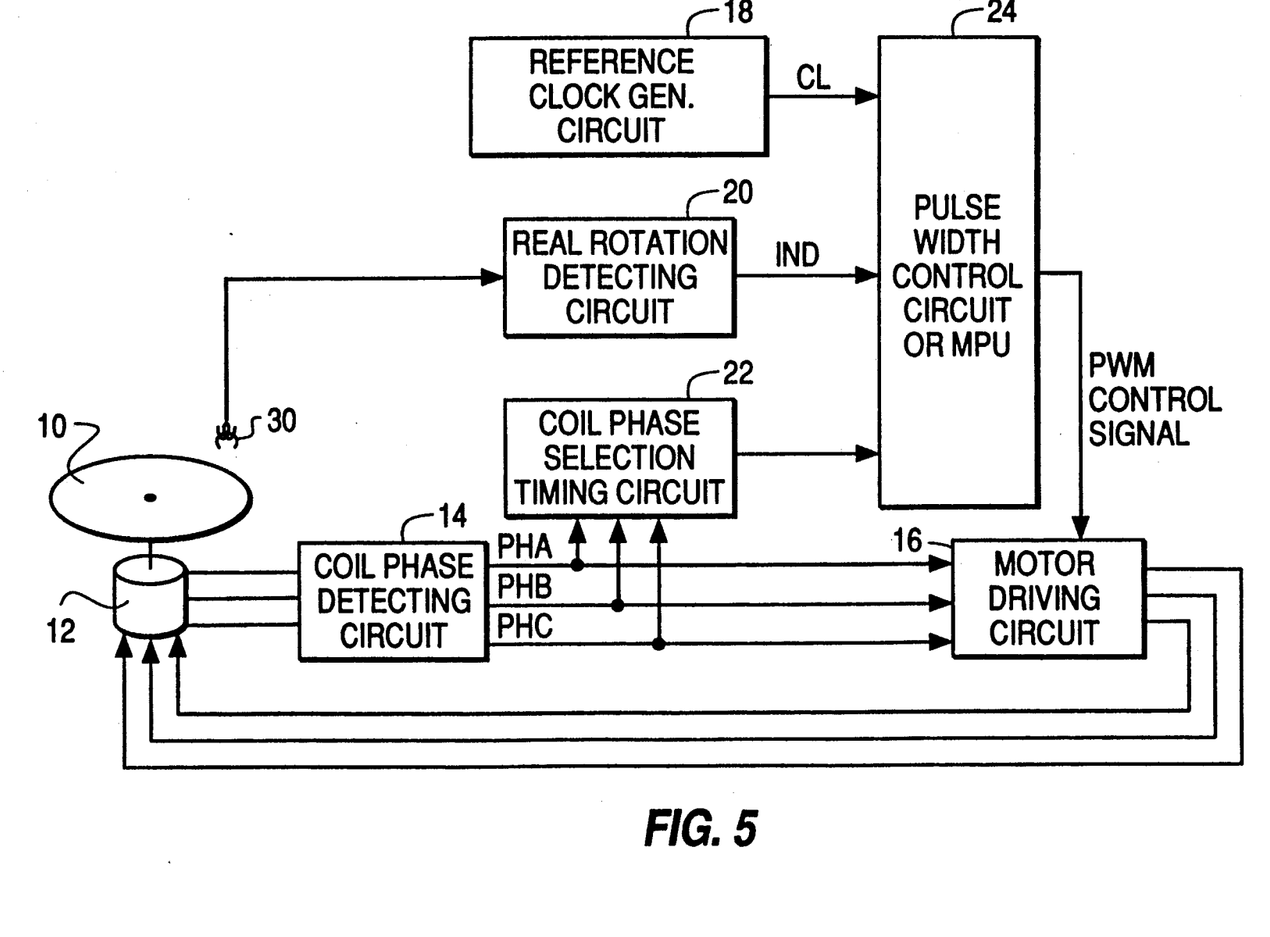
FIG. 5 is a block diagram of an embodiment of a PWM control system of the present invention.

FIG. 5 is a block diagram of an embodiment of a PWM control system of the present invention. In FIG. 5, reference numeral 10 designates a magnetic disk that can function as, for example, a rotatable recording medium. This magnetic disk 10 is rotated at a constant speed, such as 3600 rpm, by the spindle motor 12. Index information is recorded in servo tracks on the magnetic disk 10. This information can be read once for each turn of the magnetic disk 10 by a read head 30.

Figure 6:
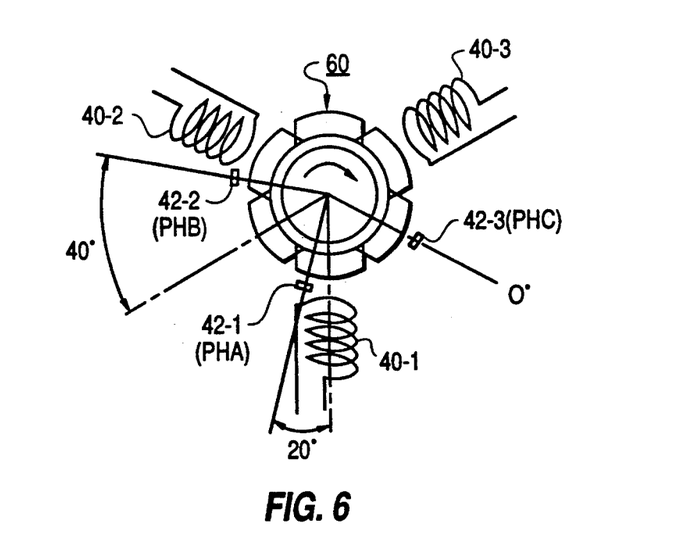
FIG. 6 is a schematic diagram illustrating an arrangement of hall elements in a 3-phase, 6-pole DC motor used with the present invention.

FIG. 6 illustrates one example of the spindle motor 12. The present invention, however, is not limited to this motor. As shown in FIG. 6, the spindle motor 12 is a brushless 3-phase, 6-pole DC motor having three stator coils and six magnetic poles.

Referring to FIGS. 4(a) and 6, the coil phase detecting circuit 14 detects stator phase changes by detecting poles of the rotor 60. The coil phase detecting circuit 14 outputs three pulse train signals respectively based on corresponding outputs of Hall elements 42-1, 42-2 and 42-3.

Referring to FIG. 6, 3-phase, 6-pole DC motor includes three stator coils 40-1, 40-2, 40-3 spaced 120° apart, and a six-pole rotor 60. Hall element 42-1 is positioned 20° from the center line of a first one of the rotor poles; Hall element 42-2 is positioned 40° from the center line of a second one of the rotor poles; and Hall element 42-3 is positioned at the center line of a third one of the rotor poles. The Hall elements 42-1, 42-2, and 42-3 generate coil phase detecting outputs when they receive an orthogonal field generated by the poles of rotor 60. If the rotor 60 rotates in a clockwise direction, the coil phase detecting outputs rise in the sequence of 42-1, 42-2, 42-3.

Figures 11A, 11B:
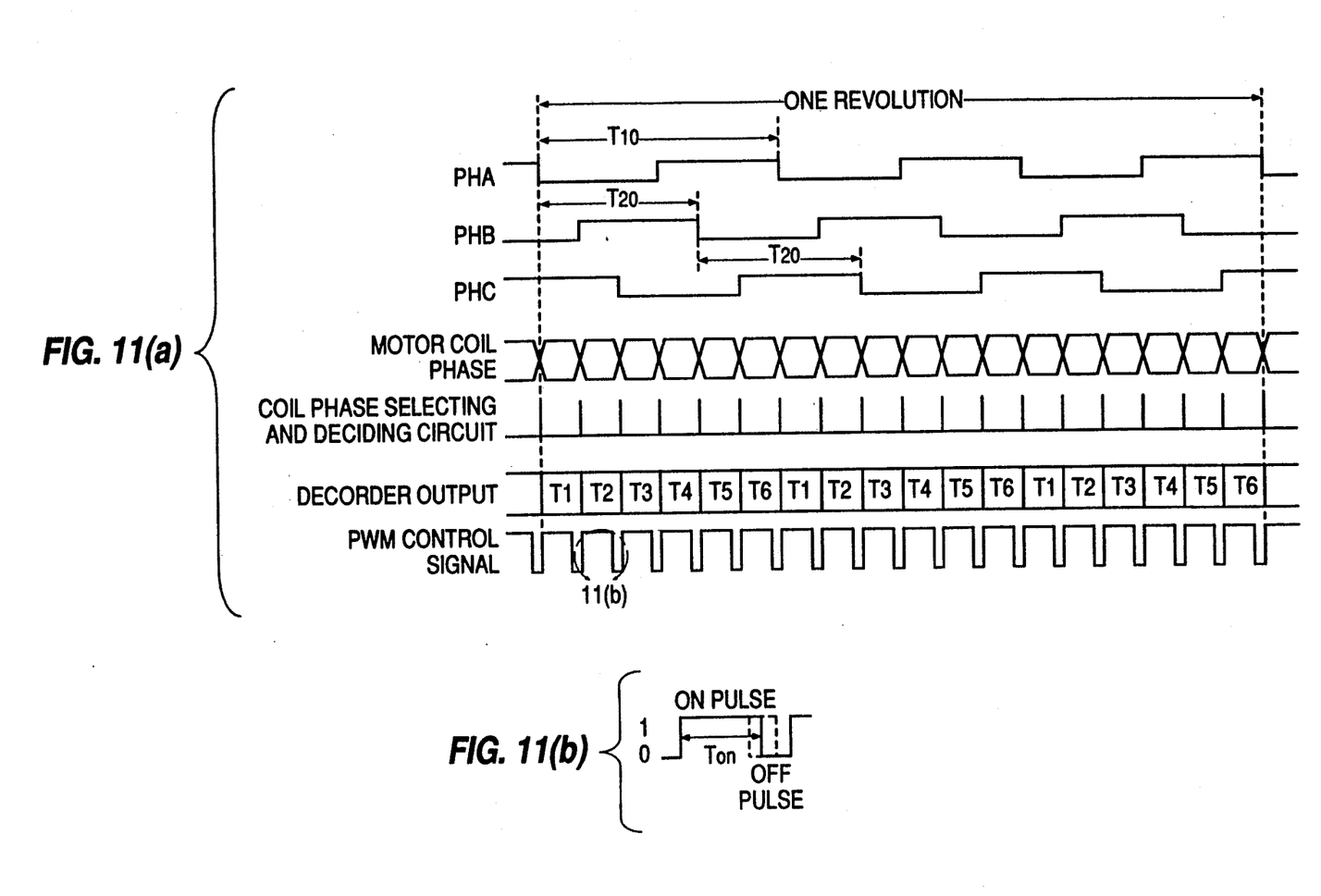
FIGS. 11(a) and 11(b) constitute a timing diagram illustrating waveforms of signals in the FIG. 5 system.

Referring to FIG. 11(a), waveform PHA corresponds to the coil phase detecting output provided by Hall element 42-1; waveform PHB corresponds to the coil phase detecting output provided by Hall element 42-2; and PHC which is the coil phase detecting signal output provided by Hall element 42-3 can be obtained.

The period T10 of pulse train PHA corresponds to 120° angle of rotation of rotor 60. The time or phase difference T20 of pulse trains PHB and PHC corresponds to an 80° angle of rotation of rotor 60.

Figure 9:
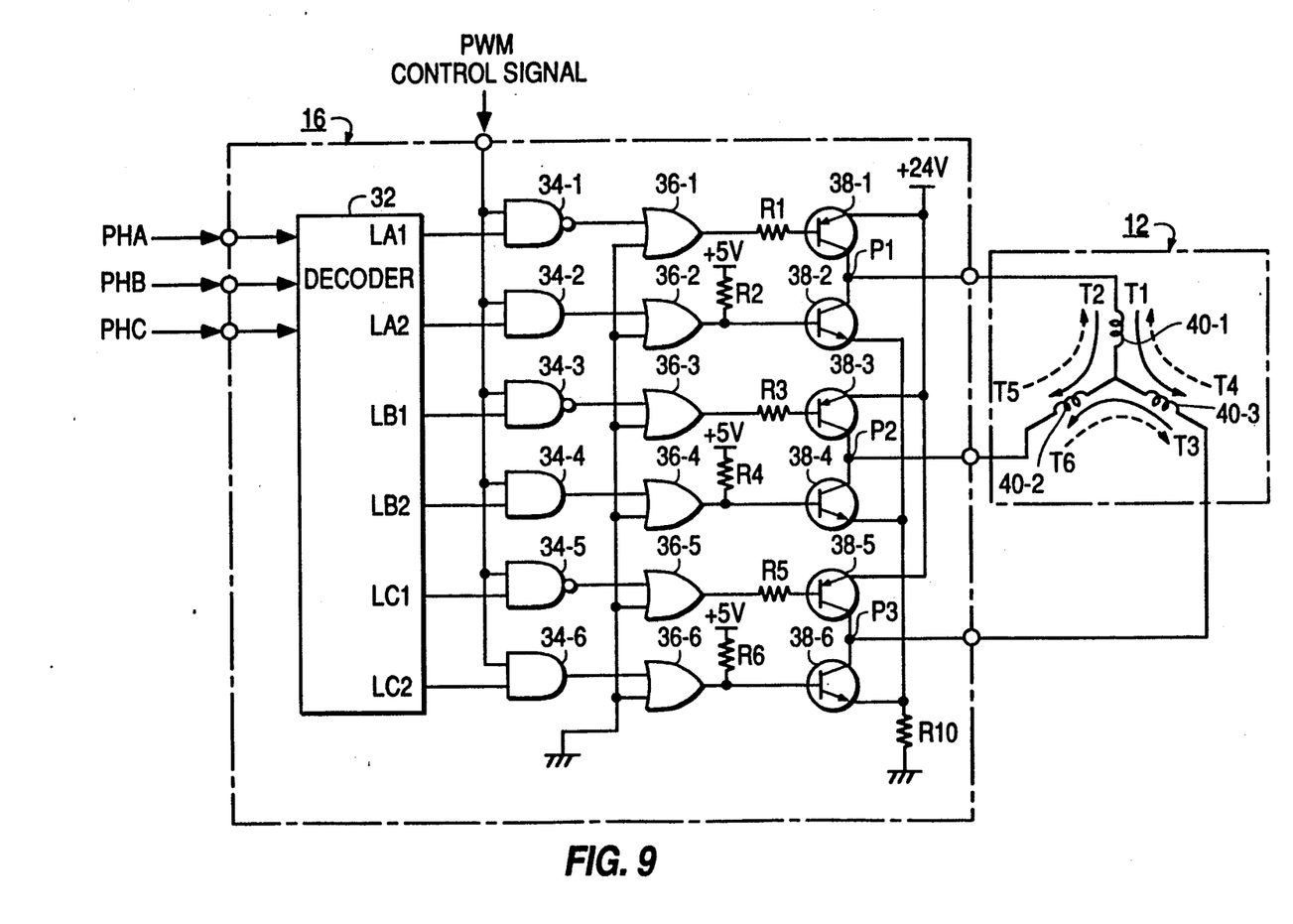
FIG. 9 is a schematic diagram of a motor driving circuit used with the present invention shown in FIG. 5.

As shown in FIG. 5, the three coil phase detection outputs PHA, PHB, PHC detected by the coil phase detection circuit 14 are applied to the motor driving circuit 16. The motor driving circuit 16 can have a structure such as shown in FIG. 9. As shown in FIG. 9, the coil phase detection outputs PHA, PHB, PHC are applied to a decoder 32. The decoder 32 can comprise a memory such as a ROM. The decoder 32 generates decoder outputs T1–T6 as shown in the Table 1.

TABLE 1

| PHA | PHB | PHC | Decoder Output |
|-----|-----|-----|----------------|
| 0   | 0   | 1   | T1             |

TABLE 1-continued

| PHA | PHB | PHC | Decoder Output |
|---|---|---|---|
| 0 | 1 | 1 | T2 |
| 0 | 1 | 0 | T3 |
| 1 | 1 | 0 | T4 |
| 1 | 0 | 0 | T5 |
| 1 | 0 | 1 | T6 |

The decoder outputs T1–T6 shown in Table 1 respectively correspond to the six decoder outputs LA1, LA2, LB1, LB2, LC1, LC2 shown in FIG. 9. The correspondence between the decoder outputs T1–T6 and the outputs of decoder 32 is shown in Table 2.

TABLE 2

| Decoder Output | LA1 | LA2 | LB1 | LB2 | LC1 | LC2 |
|---|---|---|---|---|---|---|
| T1 | 1 | 0 | 0 | 0 | 0 | 1 |
| T2 | 1 | 0 | 0 | 1 | 0 | 0 |
| T3 | 0 | 0 | 0 | 1 | 1 | 0 |
| T4 | 0 | 1 | 0 | 0 | 1 | 0 |
| T5 | 0 | 1 | 1 | 0 | 0 | 0 |
| T6 | 0 | 0 | 1 | 0 | 0 | 1 |

The outputs of decoder 32 are respectively applied to NAND gates 34-1, 34-3, 34-5 and AND gates 34-2, 34-4, 34-6 as shown in FIG. 9. The remaining inputs of the NAND gates 34-1, 34-3, 34-5 and AND gates 34-2, 34-4, 34-6, are connected to receive the PWM control signal provided by the pulse width control circuit 24 shown in FIG. 5.

The outputs of NAND gates 34-1, 34-3, 34-5 and AND gates 34-2, 34-4, 34-6 are respectively applied to OR gates 36-1 through 36-6. The remaining inputs of OR gates 36-1 through 36-6 are connected to ground (i.e., fixed to a logic 0 level). An output of OR gate 36-1 is connected to the base of PNP transistor 38-1 through a resistor R1. An output of OR gate 36-2 is pulled up to a +5 V power source through a resistor R2 and is connected to the base of NPN transistor 38-2. The emitter of PNP transistor 38-1 is connected to a +24 V power source, the collector thereof is connected to the collector of NPN transistor 38-2 and the emitter of NPN transistor 38-2 is connected to ground through a resistor R10.

An output of OR gate 36-3 is connected to the base of PNP transistor 38-3 through a resistor R3, an output of OR gate 36-4 is pulled up to the +5 V power source through a resistor R4 and is connected to the base of NPN transistor 38-4. The emitter of PNP transistor 38-3 is connected to the +24 V power source, the collector thereof is connected to the collector of NPN transistor 38-4 and the emitter of NPN transistor 38-4 is connected to ground through a resistor R10. Namely, the circuit comprising OR gates 36-1, 36-2, PNP transistor 38-1 and NPN transistor 38-2 and the circuit comprising OR gates 36-3, 36-4, PNP transistor 38-3 and NPN transistor 38-4 have similar circuit structures. The same to true for the circuit comprising OR gates 36-5, 36-6, PNP transistor 38-5 and NPN transistor 38-6.

The collector connecting point P1 of transistors 38-1 and 38-2 is connected to one end of stator coil 40-1; the collector connecting point P2 of the transistors 38-3 and 38-4 is connected to one end of stator coil 40-2; and the collector connecting point P3 of transistors 38-5 and 38-6 is connected to one end of stator coil 40-3.

The operation of the motor driving circuit 16 shown in FIG. 9 is explained below with reference to the FIGS. 11(a) and 11(b) timing diagram. FIG. 11(a) illustrates the timing of signals for a single revolution of the spindle motor 12. The motor coil phase and coil phase selecting and deciding output shown in FIG. 11(a) are also used for pulse width control as explained later.

During the period T10, the coil phase detection outputs change so that the respective logic levels of these signals vary as shown in Table 1. For each 20° of rotor rotation the coil phase detection outputs have a different state, causing the decoder 32 to provide a different output for each 20° of rotor rotation. As shown in FIG. 11(a), the outputs of decoder 32, T1–T6, vary sequentially. This sequence of signals occurs three times for a single turn of rotor 60.

For example, when the decoder output corresponds to T1, LA1 and LC2 are at logic levels 1 and the other outputs of decoder 32 are logic level 0, as shown in Table 2. In this state, if the NAND gates 34-1 and AND gates 34-6 are enabled by the PWM control signal, the PNP transistor 38-1 turned ON. Therefore, the power source +24 V reaches the stator coils 40-1, 40-3 of spindle motor 12 from the point P1 through the PNP transistor 38-1 in the ON state, and a motor drive current flows to a resistor R10 from the NPN transistor 38-6 in the ON state. In this case, the drive current is indicated by the arrow mark T1 of a solid line for the stator coils 40-1, 40-3 of the spindle motor 12. The ON-OFF control of transistors 38-1 through 38-6 is also carried out for the remaining decoder outputs T2 through T6 based on the logic levels shown in the Table 2; and the resulting currents are indicated by the arrow marks T2 through T6 flow into the spindle motor 12 as shown in FIG. 9. The motor drive circuit 16 controls the power applied to the spindle motor 12 by selecting the stator coil that has current flowing through it. This selection is based on the coil phase detecting outputs.

Figure 10A:
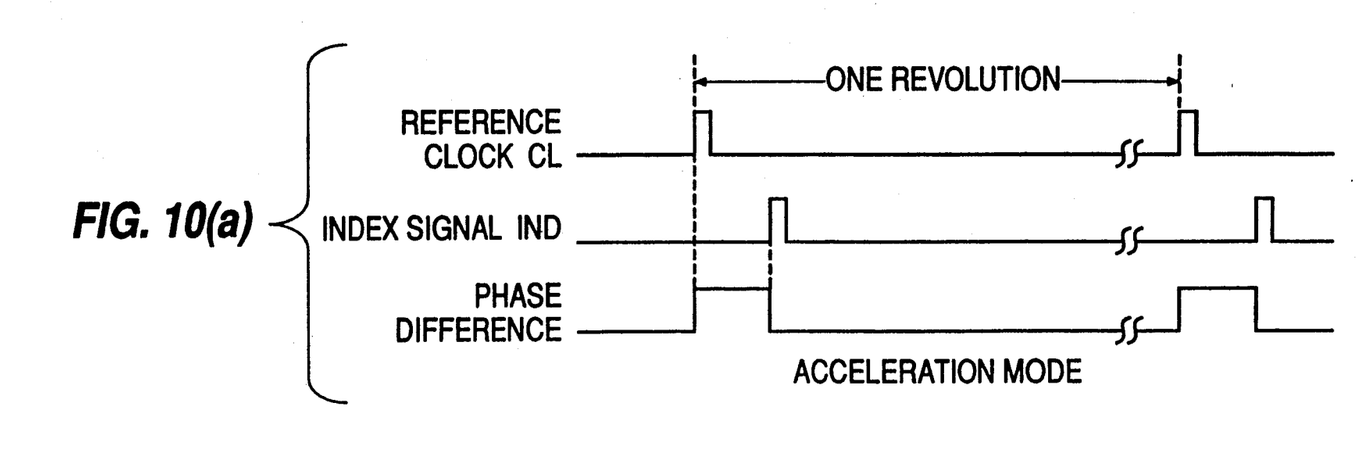
FIGS. 10(a) and 10(b) are timing diagrams illustrating an acceleration/deceleration condition in the FIG. 5 system.
Figure 10B:
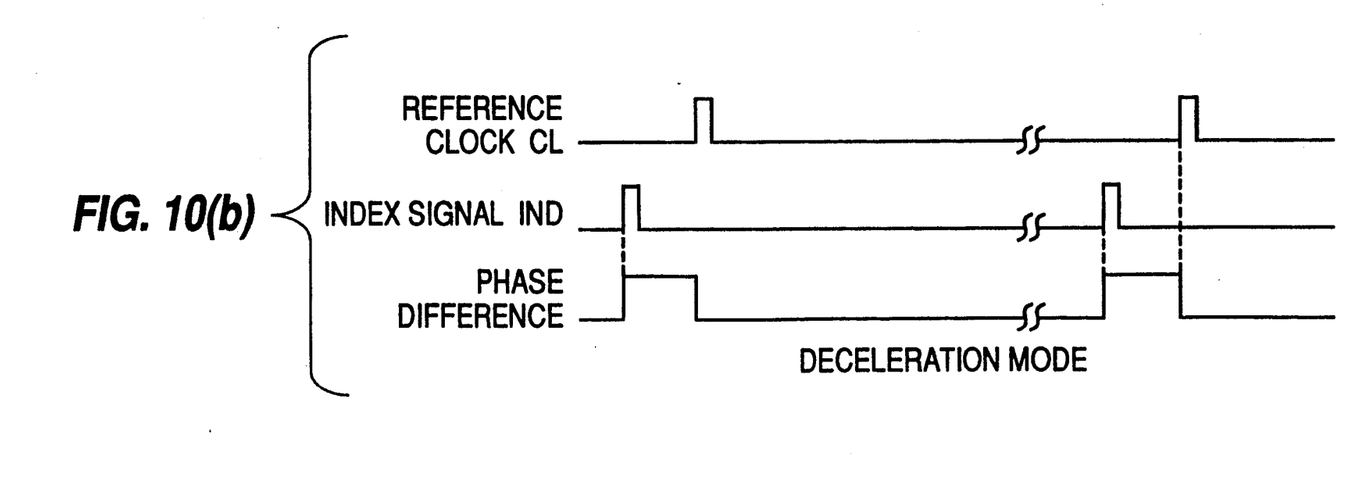

Referring to FIG. 5, a reference clock generating circuit 18 includes a crystal oscillator for generating a reference clock CL as shown in FIGS. 10(a) and 10(b). A real rotation detecting circuit 20 and a coil phase deciding circuit 22 are also provided to provide inputs to pulse width control circuit 24. The reference clock CL has a period that corresponds to a single revolution of spindle motor 12 rotating to a speed of 3,600 rpm. Therefore, the reference clock CL has a period of 1/60s.

Figure 7:
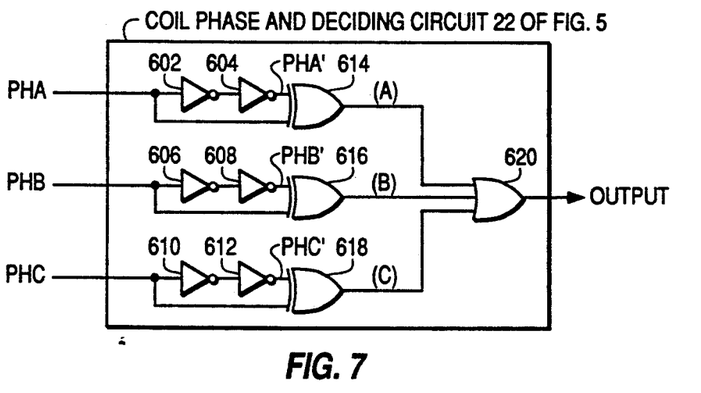
FIG. 7 is a schematic diagram of a part of the FIG. 5 system.
Figure 8A:
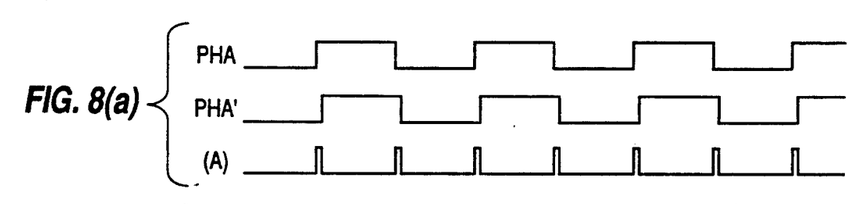
FIGS. 8(a)–8(d) are timing diagrams of signals illustrating the operation of a part of the FIG. 5 system.
Figure 8B:
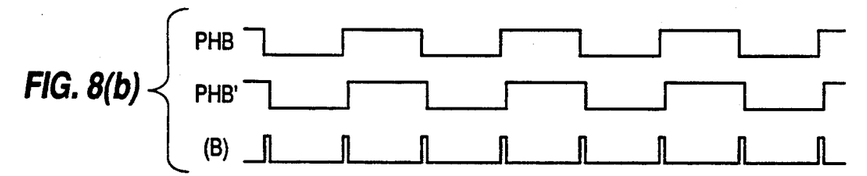
Figure 8C:
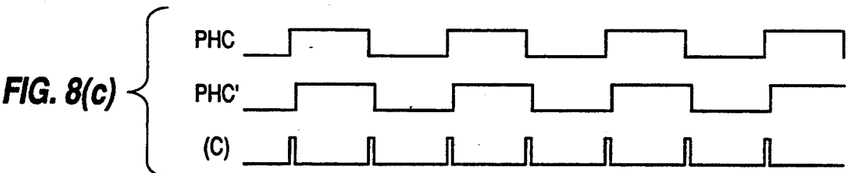
Figure 8D:
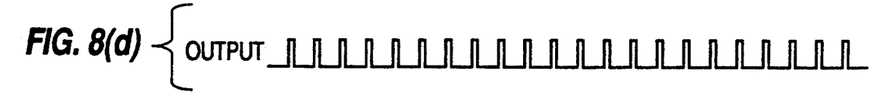

The real rotation detecting circuit 20 detects an index signal IND that is read by the read head from servo tracks on magnetic disk 10. The period of this index signal IND indicates the actual rotating speed of the disk 10. The coil phase selection timing circuit 22 generates outputs based on the three coil phase detecting outputs PHA, PHB, PHC. FIG. 7 is a schematic diagram of the coil phase selection timing circuit 22 shown in FIG. 5. FIGS. 8(a)–8(c) are timing diagrams of signals illustrating the operation of the coil phase selection timing circuit 22. In FIG. 7, signals PHA, PHB, and PHC are respectively delayed by corresponding inverter pairs (602, 604; 606, 608; and 610, 612). The signals PHA, PHB and PHC are respectively applied to exclusive OR gates 614, 616 and 618. The outputs of these exclusive OR gates are applied to OR gate 620. The output of the coil phase and deciding circuit 22 is shown in FIG. 8. Thus, the coil phase and deciding circuit 22 detects the leading and trailing edges of each of the signals PHA, PHB and PHC.

As seen from FIG. 11(a), the decoder outputs T1–T6 change at a leading or trailing edge of the three coil phase detection outputs PHA, PHB, PHC. The leading and trailing edges of the coil phase detection outputs PHA, PHB, PHC also determine selection of the timing of the stator coil phases.

The outputs of the reference clock generating circuit 18, the real rotation detecting circuit 20 and the coil phase selection timing circuit 22 are applied to the pulse width control circuit 24. The pulse width control circuit 24 detects a phase difference between the reference clock and the index signal. When the index signal IND is delayed with respect to the reference clock CL (as shown in FIG. 10(a)), a delay of phase is detected; and when the index signal IND leads the reference clock CL (as shown in FIG. 10(b)), a lead of phase is detected. The pulse width control circuit 24 calculates, in synchronism with coil phase selection timing output, the ON pulse width, Ton, of the PWM control signal (FIG. 11(b)) on the basis of this detected phase difference. The pulse width control circuit 24 outputs, to the motor drive circuit 16, the PWM control signal. As shown in FIG. 9, the PWM control signal is applied to the inputs of the NAND gates 34-1, 34-3, 34-5 and AND gates 34-2, 34-4, 34-6 of the motor drive circuit 16 shown in FIG. 9.

Figure 12:
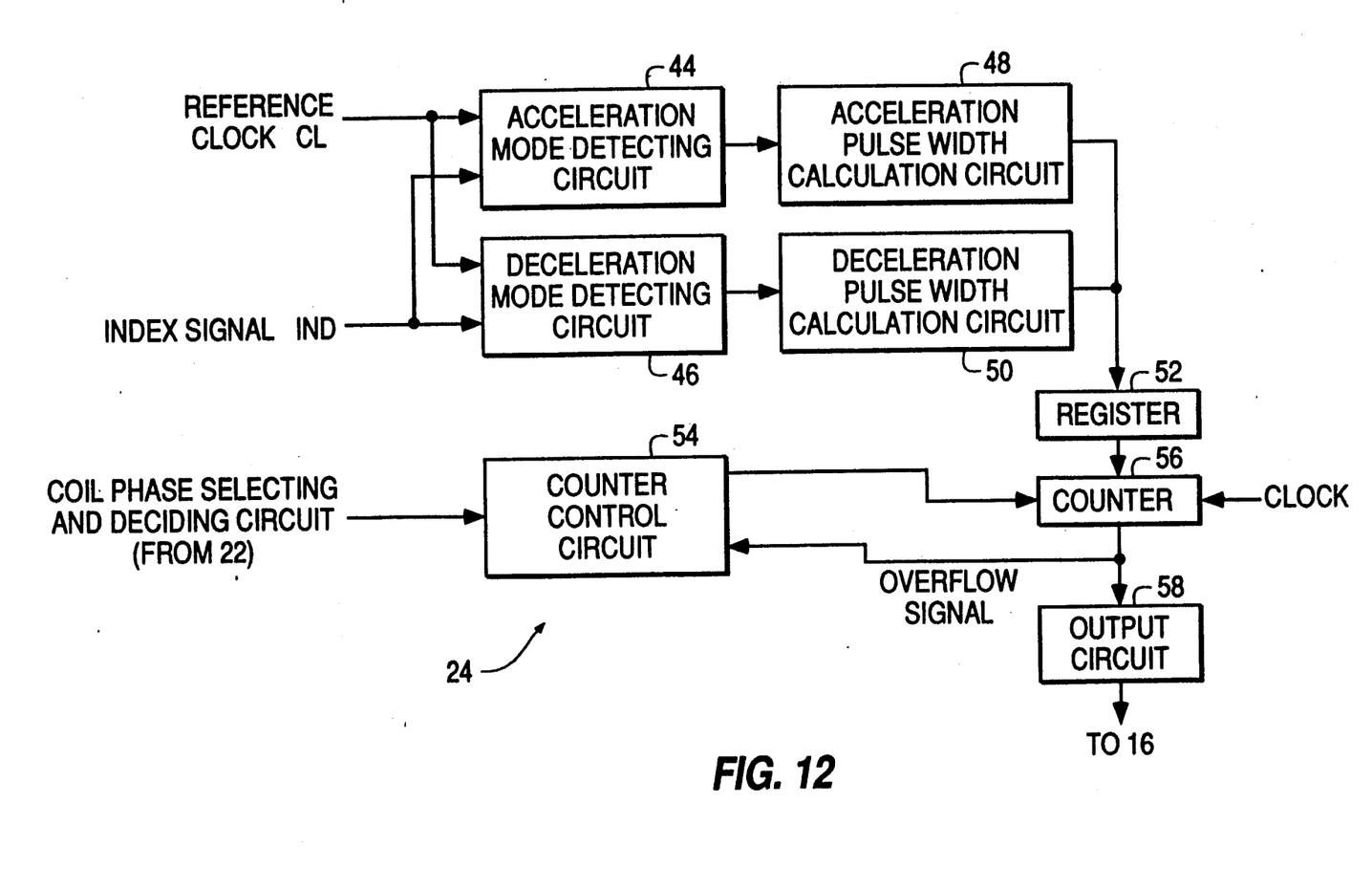
FIG. 12 is a block diagram illustrating a pulse width control circuit in the FIG. 5 system.

FIG. 12 is a block diagram of the pulse width control circuit 24 of the FIG. 5 system. In FIG. 12, reference numeral 44 designates an acceleration mode detecting circuit, and reference numeral 46 designates a deceleration mode detecting circuit to which the reference clock CL and index signal IND are input. As shown in FIG. 10(a), the acceleration mode detecting circuit 44 detects the acceleration mode when the index signal IND is delayed with respect to the reference clock CL, and detects delay of phase between the index signal IND and the reference clock CL. The deceleration mode detecting circuit 46 detects, as shown in FIG. 10(b), the deceleration mode when the index signal IND leads the reference clock CL and simultaneously detects lead of phase between the index signal IND and the reference clock CL.

A signal representing the delay of phase detected by the acceleration mode detecting circuit 44 is applied to the acceleration pulse width calculation circuit 48. The amount of pulse width Ton increase due to acceleration control is calculated in the acceleration pulse width calculation circuit 48. Moreover, a signal representing the lead of phase detected by the deceleration mode detecting circuit 46 is applied to the deceleration pulse width calculation circuit 50. The amount pulse width Ton decrease due to deceleration control is calculated in the deceleration pulse width calculation circuit. Example parameters of such control follow.

When the disk 10 rotates at 3,600 rpm, the time for or the period of a single rotation is 1/60 sec (=16.7 ms). During this time coil phase selection is carried out 18 times. Therefore, the period for only one coil phase is 1/1080 sec (=926.5 us). The ON pulse width (Ton) const. can be fixed at, for example, to 800 us. Control is achieved by varying the pulse width, depending on the phase difference, within the range of T'on= +100 us. Thus, an actual on time would have a value of Ton=(-Ton) const. +T'on with a resolution of 1/1080 sec. If the acceleration mode detecting circuit 44 detects a phase difference X, then the value Y applied to the register 52 is determined as follows.

$$Y = aX + a_1 X_1 - b_1 Y_1$$

where a, $a_1$ and $b_1$ are coefficients, and $X_1$ is the previously measured phase difference and $Y_1$ is the previous value applied to register 52.

In a preferred embodiment, a= +7.76106; $a_1$ =7.26532, and $b_1$ = −0.502457. The sign of the calculated pulse width varies in dependence upon the mode of the control system. For example, in the acceleration mode as shown in FIG. 10(a), there is a positive amount of phase difference with respect to the reference clock CL. Accordingly, the value stored in the register 52 is a positive value. In the deceleration mode, there is a negative phase difference with respect to the reference clock CL as shown in FIG. 10(b). As a result, the value stored in register 52 has a minus sign. Using this convention, the ON pulse of the PWM control signal is longer in the acceleration mode, and is shorter in the deceleration mode.

The pulse width Ton calculated by the acceleration pulse width calculating circuit 48 or deceleration pulse width calculation circuit 50 is stored in the register 52. A counter 56 and a counter control circuit 54 are connected to the register 52. Upon reception of the coil phase selecting and deciding signal, the counter control circuit 54 loads a value of the pulse width Ton that is stored in the register 52 into the counter 56 and simultaneously starts the count operation by supply of a clock to the counter 56. The counter control circuit 54 which has started the counting operation of counter 56 monitors for overflow of the counter 56 by monitoring an overflow signal provided by the counter 56. The counter control circuit 54 then stops the count operation when the counter 56 overflows as indicated by the overflow signal being, for example, a logic 0.

An output circuit 58 receives the overflow signal from counter 56 and outputs an ON PWM control signal as a logic 1 when the overflow signal is, for example, logic 0; namely, during the counting operation of counter 56 the output circuit 58 also outputs an OFF PWM control signal as a logic 0 when the overflow signal is, for example, logic 1. As a result, the pulse width control circuit 24 shown in FIG. 12 outputs the PWM control signal having leading and trailing edges that are synchronized with the coil phase selection and timing output that is based on the motor coil phase detecting signal as shown in FIG. 11(a).

The PWM control signal output by the pulse width control circuit 24 is applied to the NAND gates 34-1, 34-3, 34-5 and the AND gates 34-2, 34-4, 34-6 of the motor drive circuit 16 shown in FIG. 9. The NAND gates 34-1, 34-3, 34-5 and AND gates 34-2, 34-4, 34-6 are enabled while the PWM control signal has a logic level 1. In this condition, the outputs of decoder 32 are applied to OR gates 36-1 through 36-6. The NAND gates 34-1, 34-3, 34-5 and AND gates 34-2, 34-4, 34-6 are inhibited while the PWM control signal has a logic level 0. Thereby, a drive current flows into the spindle motor 12 based on the decoder outputs T1-T6 during the ON pulse period of the PWM control signal, namely during the period when the PWM control signal is a logic level 1. Accordingly, PWM control of spindle motor 12 can be realized.

Figure 13:
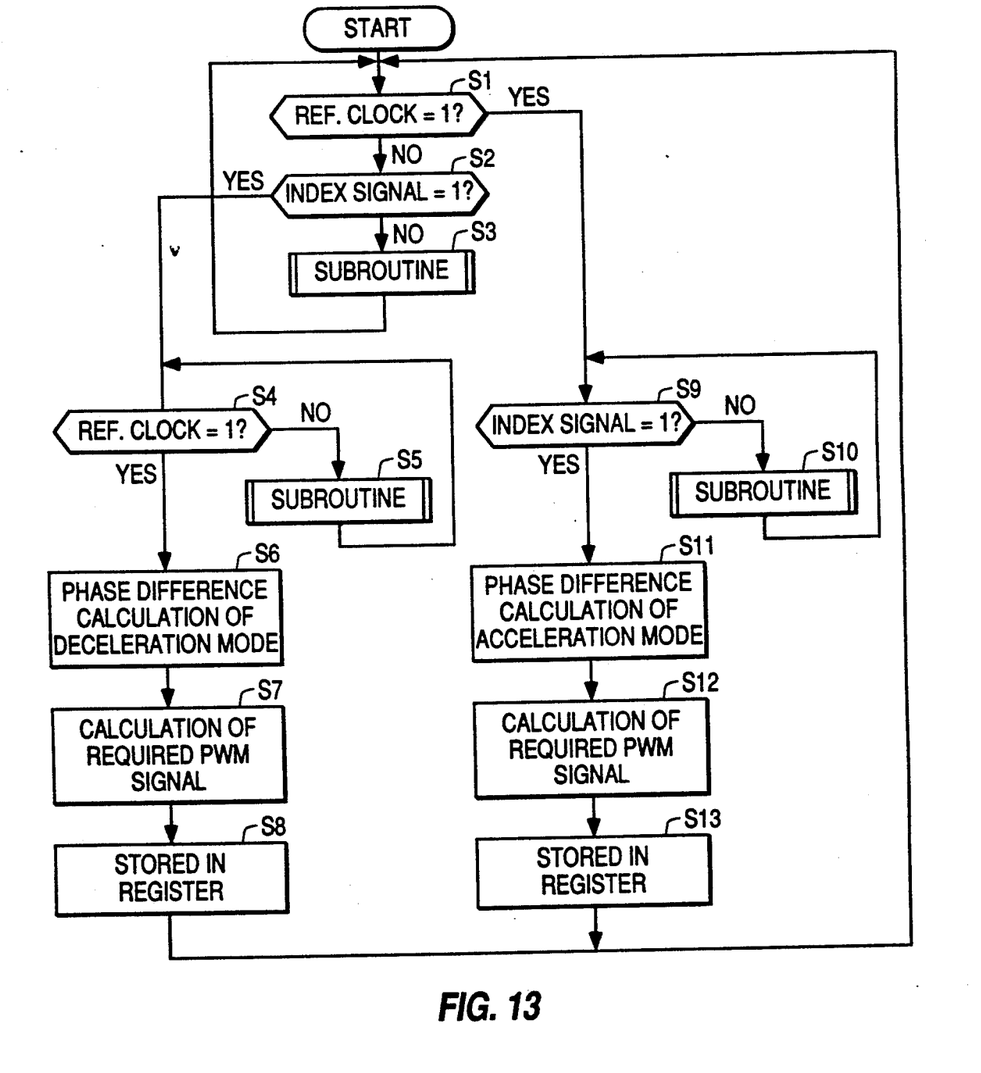
FIG. 13 is a flow chart illustrating pulse width control in a PWM control system embodying the present invention.
Figure 14:
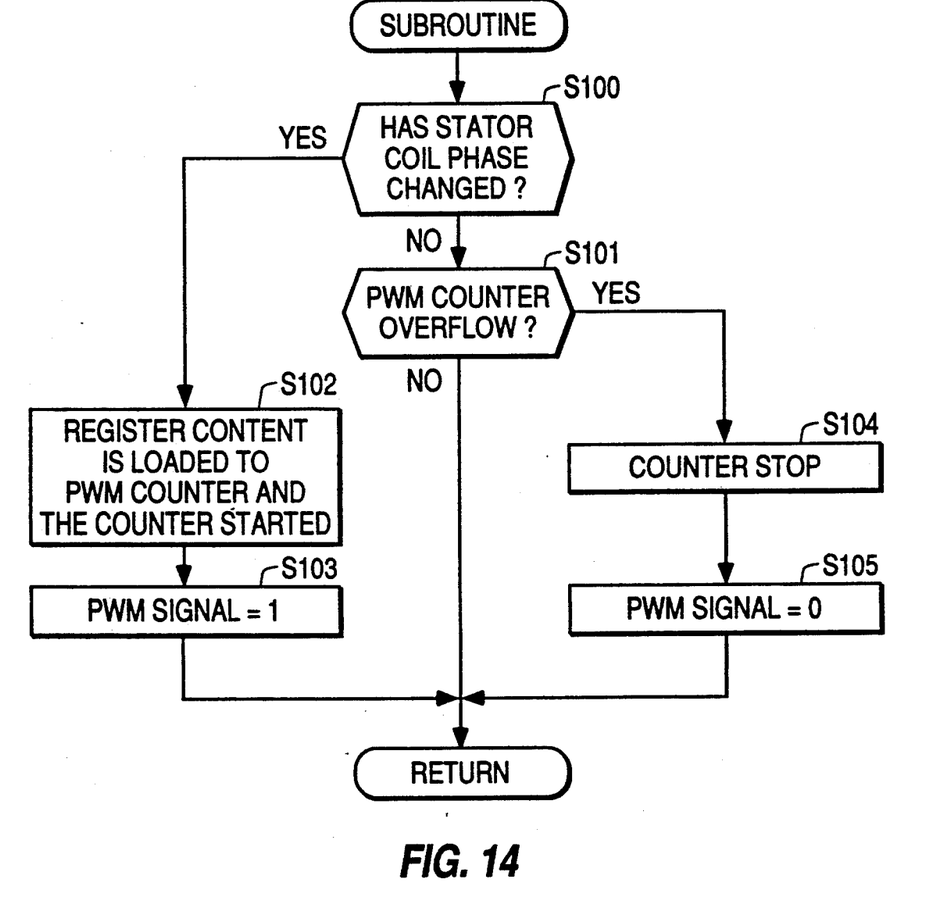
FIG. 14 is a flow chart illustrating further details of the FIG. 13 control.

FIG. 13 is a flowchart illustrating pulse width control processing in accordance with the present invention. More particularly, FIG. 13 represents logic flow for a microprocessor implementation of the FIG. 12 pulse width control circuit. FIG. 14 illustrates the logic flow of a subroutine referenced in FIG. 13. The microprocessor can comprise, for example, a model 8031 manufactured by Intel Corp. Referring to FIG. 13, the reference clock is monitored; namely the processor determines if CL=1 in the step S1. If the reference clock is not a logic 1, processing proceeds to step S2 to check if the index signal IND is a logic 1; namely the processor determines if IND=1.

If the index control is not a logic 1, processing proceeds to the subroutine in the step S3. This subroutine will be explained later. If the index signal is a logic 1, processing proceeds to step S4. In step S4, the processor again checks if the reference clock is a logic 1. The subroutine (step S5) is repeatedly executed until the reference clock is a logic 1. When the reference clock is a logic 1, processing proceeds to the step S6 calculates a phase difference in the deceleration mode. Namely, since the index signal was detected as being a logic 1 in step S2 and the reference clock was detected as a logic 1 in step S4, the control system is in the deceleration mode. Accordingly, a deceleration mode phase difference is calculated because the index signal IND leads the reference clock CL as shown in FIG. 10(b). This mode indicates that the motor 12 rotational speed is too high. In step S7, the pulse width Ton of the PWM control signal is calculated based on the phase difference obtained in step S6, and the calculation result is stored in a register in step S8.

If, in step S1, the reference clock is a logic 1, then processing proceeds to step S9 to check if the index signal is a logic 1. If the index signal is not a logic 1, the subroutine of step S10 is repeatedly executed until the index signal becomes a logic 1. When, in step S9, the index signal is detected as a logic 1, processing proceeds to step S11 and calculates a phase difference in the acceleration mode. Namely, since the index signal was detected as being a logic 1 in step S9 and the reference clock was detected as being a logic 1 in step S1, the control system is in the acceleration mode. Accordingly, an acceleration mode phase difference is calculated in step 11 because the index signal IND occurs after the reference clock CL as shown in FIG. 10(a). This mode indicates that the motor 12 rotational speed is too low. In step S12, the pulse width Ton of the PWM control signal is calculated based on the phase difference obtained in step S11, and the calculation result is stored in a register in step S13.

Referring to FIG. 14, the subroutine referenced in FIG. 13 performs output control of the PWM control signal based on the pulse width Ton stored in the register in the step S8 or S13 of FIG. 13. In step S100, the processor determines if the stator coil phase has changed. When the processor detects that the stator coil phase has changed, processing proceeds to the step S102. In step S102, the contents of the register is loaded into a PWM counter and the counting operation is started. The PWM control signal is turned ON in the step S103; namely, the PWM control signal is set to a logic 1 and processing returns to the main routine of FIG. 13.

When the processor detects that the stator coil phase has not changed, processing proceeds to step S101. In step S101 the processor monitors the PWM counter for an overflow condition. If the PWM counter has not overflowed, processing returns to the main routine of FIG. 13. When the PWM counter does overflow, processing proceeds to step S104 in order to stop the counting operation. In step S105, the PWM control signal is set to OFF; namely, to the logic level 0 from 1 and processing returns to the main routine of FIG. 13.

As a result of the above processing, the PWM control signal is synchronized with the coil phase selection timing. As shown in FIG. 11(a), the leading edge of the PWM control signal is synchronized with the coil phase selection and deciding output. Also, as discussed with reference to FIGS. 13 and 14, the PWM control signal can be generated by program control.

The above embodiment uses a 3-phase, 6-pole DC motor. The present invention, however, is not limited thereto. For example, the embodiment explained above can also be applied to PWM control of spindle motors having various rotating speeds such as a 3-phase, 8-pole spindle motor rotating at 4,800 rpm or 3-phase, 4-pole spindle motor rotating at 2,400 rpm.

As explained previously, the present invention provides highly accurate and highly effective spindle motor speed control. With this control, the PWM control signal has a constant positional relationship with the spindle motor torque curve based on detecting the stator coil phase. Control in accordance with the present invention maintains a constant acceleration rate regardless of the rotational position of the motor, and minimizes steady phase difference by synchronizing the leading edge of the PWM control signal with the selection timing of the stator coil phase.

The foregoing is considered as illustrative only of the principles of the invention. Further, since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

I claim:

1. A pulse width modulation (PWM) control system for a DC motor having a plurality of stator coils and rotor magnets, and having a position sensor for sensing a rotational position of the rotor, said PWM control system comprising:
    (a) stator coil phase detecting means operatively connected to the position sensor for detecting a stator coil phase based on a signal from the position sensor and for providing a detecting signal based on the detected stator coil phase;
    (b) rotation reference signal generating means for generating a rotation reference signal;
    (c) real rotation detecting means for detecting a real rotation of the rotor and for providing an index signal based on said detection of real rotation;
    (d) coil phase selection timing means for determining selection of timing of the stator coil phase based on the detecting signal and for providing a coil phase selecting signal based on said selection of timing and said detecting signal;
    (e) pulse width control means for detecting a phase difference between the rotation reference signal and the index signal, and for providing the PWM control signal with the determined pulse width in synchronization with the determination of said coil phase selection timing; and
    (f) motor driving means for selecting, based on the PWM control signal, at least one of the stator coils based on the detecting signal and for supplying power to the selected coil during the PWM control signal.

2. The PWM control system of claim 1, wherein said pulse width control means has an acceleration mode and a deceleration mode, and comprises:
   (a) acceleration mode detecting means for detecting the acceleration mode based on the index signal occurring after the rotation reference signal;
   (b) deceleration mode detecting means for detecting the deceleration mode based on the index signal occurring before the rotation reference signal;
   (c) accelerated pulse width calculation means for calculating the pulse width of the PWM control signal to accelerate the DC motor in the acceleration mode; and
   (d) decelerated pulse width calculation means for calculating the pulse width of the PWM control signal to decelerate the DC motor in the deceleration mode.

3. The PWM control system of claim 1, wherein said pulse width control means comprises:
   (a) acceleration mode detecting means for detecting the acceleration mode based on the index signal occurring after the rotation reference signal;
   (b) deceleration mode detecting means for detecting the deceleration mode based on the index signal occurring before the rotation reference signal;
   (c) accelerated pulse width calculation means for calculating the pulse width of the PWM control signal to accelerate the DC motor in the acceleration mode; and
   (d) decelerated pulse width calculation means for calculating the pulse width of the PWM control signal to decelerate in the deceleration mode;
   (e) register means for storing a calculation result of at least one of said accelerated pulse width calculation means and said decelerated pulse width calculation means;
   (f) counter control means, having an overflow state, for counting based on the contents of said register and said coil phase selecting signal for register and said coil phase selecting signal and for suspending counting operation in said overflow state; and
   (g) output circuit means for outputting the PWM control signal such that the PWM control signal is ON during the counting operation and is OFF during suspension of the counting operation.

4. The PWM control system of claim 1, wherein the DC motor has M stator coils and N magnetic rotor poles, and said coil phase selection timing means includes means for generating said coil phase selecting signal based on detection of the N magnetic rotor poles.

5. The PWM control system of claim 1, wherein the position sensor includes M hall elements, and wherein said stator coil phase detecting means includes means for providing the coil phase detecting signal as including three pulse trains having a duty ratio of 50%, and a period corresponding to a rotating angle of $2\pi/M$.

6. The PWM control system of claim 5, wherein said coil phase selection timing means includes means for providing the coil phase selecting signal in synchronism with the three pulse trains.

7. A pulse width modulation (PWM) control system for a DC motor having a plurality of stator coils and rotor magnets, and having a position sensor for sensing a rotational position of the rotor, said PWM control system comprising:
   (a) stator coil phase detecting means operatively connected to the position sensor for detecting a stator coil phase based on a signal from the position sensor and for providing a detecting signal based on the detected stator coil phase;
   (b) rotation reference signal generating means for generating a rotation reference signal;
   (c) real rotation detecting means for detecting a real rotation of the rotor and for providing an index signal based on said detection of real rotation;
   (d) coil phase selection timing means for determining selection of timing of the stator coil phase based on the detecting signal and for providing a coil phase selecting signal based on said selection of timing and said detecting signal;
   (e) program controlled microprocessor including processor means for detecting a phase difference between the rotation reference signal and the index signal, and for providing the PWM control signal with the determined pulse width in synchronization with the determination of said coil phase selection timing means; and
   (f) DC motor driving means for selecting, based the PWM control signal, at least one of the stator coils based on the detecting signal and for supplying power to the selected coil during the PWM control signal.

8. The PWM control system of claim 7, wherein said processor means comprises:
   (a) acceleration mode detecting means for detecting the acceleration mode based on the index signal occurring after the rotation reference signal;
   (b) deceleration mode detecting means for detecting the deceleration mode based on the index signal occurring before the rotation reference signal;
   (c) accelerated pulse width calculation means for calculating the pulse width of the PWM control signal to accelerate the DC motor in the acceleration mode; and
   (d) decelerated pulse width calculation means for calculating the pulse width of the PWM control signal to decelerate in the deceleration mode.

9. A pulse width modulation (PWM) control system for rotating a spindle motor at a constant speed, the spindle motor having stator coils and rotor magnets, said PWM control system comprising:
   (a) stator coil phase detecting means for detecting a stator coil phase based on detecting a rotor magnet, and for providing a detecting signal based on said detected phase;
   (b) rotation reference signal generating means for generating a rotation reference signal which defines the constant speed;
   (c) real rotation detecting means for detecting a real rotation speed of the rotor and for providing an index signal based on said detection of real rotation;
   (d) coil phase selection timing means for determining selection of timing of the stator coil phase based on the detecting signal and for providing a coil phase selecting signal based on said selection of timing and said detecting signal;
   (e) pulse width control means for detecting a phase difference between the rotation reference signal and the index signal, and for providing the PWM control signal with the determined pulse width in synchronization with the determination of said coil phase selection timing; and
   (f) spindle motor driving means for selecting, based on the PWM control signal, at least one of the stator coils based on the detecting signal and for supplying power to the selected coil during the PWM control signal.

10. The PWM control system of claim 9, wherein said pulse width control means comprises:
    (a) acceleration mode detecting means for detecting the acceleration mode based on the index signal occurring after the rotation reference signal;
    (b) deceleration mode detecting means for detecting the deceleration mode based on the index signal occurring before the rotation reference signal;
    (c) accelerated pulse width calculation means for calculating the pulse width of the PWM control signal to accelerate the DC motor in the acceleration mode; and
    (d) decelerated pulse width calculation means for calculating the pulse width of the PWM control signal to decelerate the DC motor in the deceleration mode.

11. The PWM control system of claim 9, wherein said pulse width control means comprises:
    (a) acceleration mode detecting means for detecting the acceleration mode based on the index signal occurring after the rotation reference signal;
    (b) deceleration mode detecting means for detecting the deceleration mode based on the index signal occurring before the rotation reference signal;
    (c) accelerated pulse width calculation means for calculating the pulse width of the PWM control signal to accelerate the DC motor in the acceleration mode; and
    (d) decelerated pulse width calculation means for calculating the pulse width of the PWM control signal to decelerate in the deceleration mode;
    (e) register means for storing a calculation result of at least one of said accelerated pulse width calculation means and said decelerated pulse width calculation means;
    (f) counter control and said coil phase selecting signal for register and said coil phase selecting signal and for suspending counting operation in said overflow state; and
    (g) output circuit means for outputting the PWM control signal such that the PWM control signal is ON during the counting operation and is OFF during suspension of the counting operation.

12. The PWM control system of claim 9, wherein the DC motor has M stator coils and N magnetic rotor poles, and said coil phase selection timing means includes means for generating said coil phase selecting signal based on detection of the N magnetic rotor poles.

13. The PWM control system of claim 12, wherein the position sensor includes M hall elements, and wherein said stator coil phase detecting means includes means for providing the coil phase detecting signal as including three pulse trains having a duty ratio of 50%, and a period corresponding to a rotating angle of $2\pi/M$.

14. The PWM control system of claim 12, wherein the spindle motor comprises a 3-phase, 6-magnetic pole brushless DC having three coils and six magnetic poles.

15. A pulse width modulation (PWM) control system for rotating a spindle motor at a constant speed, the spindle motor having stator coils and rotor magnets, said PWM control system comprising:
    (a) stator coil phase detecting means for detecting a change of stator coil phase based on detecting a rotor magnet, and for providing a detecting signal based on said detected phase change;
    (b) rotation reference signal generating means for generating a rotation reference signal which defines the constant speed;
    (c) real rotation detecting means for detecting a real rotation speed of the rotor and for providing an index signal based on said detection of real rotation;
    (d) coil phase selection timing means for determining selection of timing of the stator coil phase based on the detecting signal and for providing a coil phase selecting signal based on said selection of timing and said detecting signal;
    (e) pulse width control means for detecting a phase difference between the rotation reference signal and the index signal, and for providing the PWM control signal with the determined pulse width in synchronization with the determination of said coil phase selection timing; and
    (f) spindle motor driving means for selecting, based on the PWM control signal, at least one of the stator coils based on the detecting signal and for supplying power to the selected coil during the PWM control signal.

16. The PWM control system of claim 15, wherein said processor means comprises:
    (a) acceleration mode detecting means for detecting the acceleration mode based on the index signal occurring after the rotation reference signal;
    (b) deceleration mode detecting means for detecting the deceleration mode based on the index signal occurring before the rotation reference signal;
    (c) accelerated pulse width calculation means for calculating the pulse width of the PWM control signal to accelerate the DC motor in the acceleration mode; and
    (d) decelerated pulse width calculation means for calculating the pulse width of the PWM control signal to decelerate in the deceleration mode.

* * * * *